United States Patent Office 3,442,768
Patented May 6, 1969

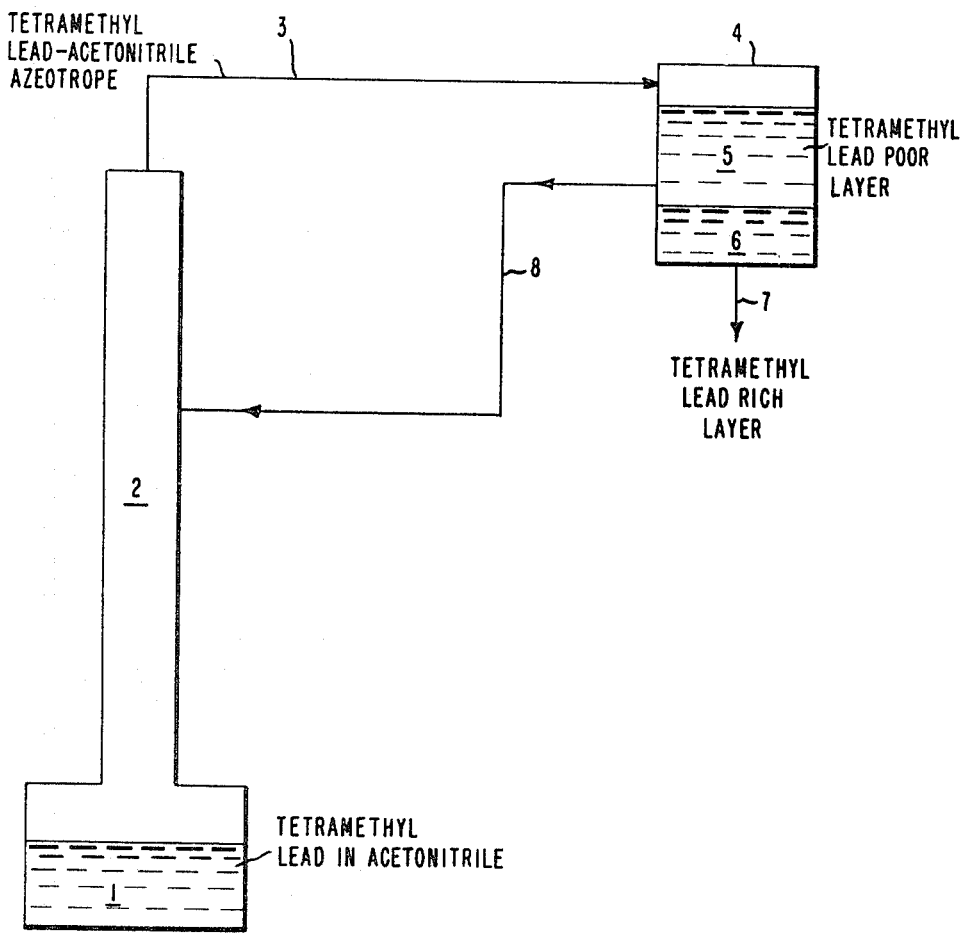

3,442,768
PROCESS FOR RECOVERING TETRAMETHYL LEAD AND AZEOTROPES FORMED THEREIN
Kenneth C. Smeltz, Wilmington, Del., assignor to E. I. du Pont de Nemours and Company, Wilmington, Del., a corporation of Delaware
Continuation-in-part of applications Ser. No. 377,312, June 23, 1964, and Ser. No. 475,006, July 26, 1965, which is a continuation of application Ser. No. 523,973, Feb. 1, 1966. This application Dec. 21, 1967, Ser. No. 692,448
Int. Cl. B01d 3/10
U.S. Cl. 203—6    13 Claims

ABSTRACT OF THE DISCLOSURE

Recovery of tetramethyl lead from solutions containing 1–37% by weight of tetramethyl lead in acetonitrile by azeotropic distillation at temperature and pressure conditions below those necessary to boil either component alone. The azeotrope separates into two liquid phases upon cooling, the lower layer being enriched in tetramethyl lead.

---

This is a continuation-in-part of my applications Ser. No. 377,312, filed June 23, 1964, now U.S. Patent 3,392,-093 issued June 9, 1968, and Ser. No. 475,006, filed July 26, 1965, now abandoned, and a continuation of my copending application Ser. No. 523,973, filed Feb. 1, 1966, now abandoned.

This invention relates to a process for recovering tetramethyl lead from reaction masses obtained in the manufacture of tetramethyl lead and more particularly from solutions of tetramethyl lead in acetonitrile.

Tetramethyl lead is well known as a valuable antiknock agent for motor fuels. It has been manufactured by reacting methyl chloride with monosodium alloy in the presence of a catalyst and usually also a thermal stabilizer of the class of volatile hydrocarbons and ethylene dichloride, as disclosed by Jarvie et al. in U.S. Patent 3,048,610, by Tullio in U.S. Patents 3,072,694 and 3,072,-695 and by Cook et al. in U.S. Patent 3,049,558.

Tetramethyl lead has a normal boiling point of 110° C. but is highly unstable to elevated temperatures. Overheating can lead to violent decomposition. Therefore, in the separation of tetramethyl lead from other reaction products occurring from its production, it is usual practice to extract the other components with water. In the case of tetramethyl lead made by the NaPb alloy-methyl chloride process, it is also known to extract the tetramethyl lead from the reaction mass with organic solvents, such as toluene. Efficient solvent extraction processes require the use of rather large amounts of expensive solvents from which it is difficult to recover the excess solvent and the tetramethyl lead in concentrated form.

Silversmith and Sloan in their U.S. Patent 3,197,392 issuing on July 27, 1965, disclose an electrolytic process for making organometal compounds, including tetramethyl lead. Particularly in their Examples 5 and 6, they disclose the preparation of tetramethyl lead by electrolyzing at a lead cathode a catholyte consisting of a methyl halide (e.g. chloride) and a tetraalkylammonium bromide in which the alkyl groups have 1–2 carbon atoms in solution in acetonitrile, whereby they obtain a solution of tetramethyl lead in acetonitrile which also contains methyl halide and tetraalkylammonium bromide. They do not disclose any specific method for recovering the tetramethyl lead from the solution but disclose that the organometal compounds may be recovered from the catholytes by conventional means.

In U.S. Patent 3,392,093, I disclose an electrolytic process for preparing tetraalkyl lead compounds, including tetramethyl lead, which is an improvement over that of Silversmith and Sloan particularly in that the catholyte also includes a small limited amount of a hydroxylic compound of the class of water and lower alkanols, such amount of hydroxylic compound being maintained and controlled within specified limits, and in that the process is primarily a continuous process. When such process is operated for the production of tetramethyl lead from a catholyte which is a solution of methyl bromide in acetonitrile with a tetraalkylammonium bromide having 1–2 carbon atoms in each alkyl group as the current carrier and about 1 to about 20 moles of said hydroxylic compound per mole of current carrier, e.g. as specifically set forth in Examples 1–B, 2, 3 and 5 thereof, there is obtained a catholyte product which is a solution of tetramethyl lead in acetonitrile which also contains some methyl bromide, tetraalkylammonium bromide, and hydroxylic compound, usually water. Said patent, in common with this application, discloses that the catholyte compositions produced in acetonitrile preferably will be subjected to fractional distillation to obtain tetramethyl lead as a low-boiling azeotropic mixture with acetonitrile which may contain a thermal stabilizer, that such azeotropic mixture on condensing and cooling separates into two liquid phases, the upper phase being rich in acetonitrile and the lower phase being rich in tetramethyl lead, and that the tetramethyl lead and mixtures thereof with thermal stabilizer can be recovered free of acetonitrile by washing the distillate with water. Also, said application discloses that the known thermal stabilizers for the tetramethyl lead usually are volatile hydrocarbons such as isooctane, terpenes, toluene and the like. While the tetramethyl lead, together with the thermal stabilizer when present, may be recovered from the catholytes of Silversmith and Sloan and of U.S. Patent 3,392,093 by washing with water, the amount of water so required is undesirably large for the relatively small amount of tetramethyl lead to be obtained, tetramethyl lead being soluble in acetonitrile to the extent of only about 37% by weight at 25° C.

It is an object of this invention to provide a new and improved process for recovering tetramethyl lead from the prior art reaction masses. Another object is to provide a process for recovering tetramethyl lead from its solutions in acetonitrile. A further object is to provide a process for converting solutions of tetramethyl lead in acetonitrile to compositions materially more concentrated in tetramethyl lead and from which the tetramethyl lead may be more readily recovered. Other objects are to advance the art. Still other objects will appear hereinafter.

The above and other objects of this invention are accomplished by the process for recovering tetramethyl lead from a solution thereof in acetonitrile, which comprises:

(A) Distilling a solution containing from about 1% to about 37% by weight of tetramethyl lead in acetonitrile in a distillation column at a head temperature of from about 35° C. to about 80° C. under a pressure of from about 0.2 to about 1 atmosphere, (B) Taking off at least one overhead fraction comprising a mixture of tetramethyl lead and acetonitrile which is enriched in tetramethyl lead content and boils below the boiling point of pure acetonitrile at the distillation pressure, and (C) Recovering the tetramethyl lead from said mixture.

It will be understood that the solution containing tetramethyl lead in acetonitrile may consist solely of tetramethyl lead and acetonitrile or may contain substantial amounts of other materials which do not interfere with the azeotropic distillation, such as thermal stabilizers for the tetramethyl lead, water, and other materials of the reaction masses obtained in the manufacture of the tetramethyl lead.

It has been found that, when a solution of tetramethyl lead in acetonitrile is subjected to fractional distillation in a distillation column under the aforesaid conditions, mixtures of tetramethyl lead and acetonitrile enriched in tetramethyl lead distill over at temperatures below the boiling point of acetonitrile and of tetramethyl lead at such pressures, whereby the distillate fractions contain the tetramethyl lead in much higher concentrations than the starting solutions, much of the acetonitrile being left as residue in the still from which it can be recovered readily. Apparently, this is due to the formation, under the distillation conditions, of low-boiling azeotropic mixtures, such as a low-boiling azeotropic mixture of tetramethyl lead with acetonitrile which consists essentially of about 61.2% by weight of tetramethyl lead and about 38.8% by weight of acetonitrile and boils at about 73.3° C. at atmospheric pressure. On cooling below its boiling point, e.g. to 25° C. or below, such mixture separates into two phases or layers, the upper phase being rich in acetonitrile and poor in tetramethyl lead and the lower phase being rich in tetramethyl lead and poor in acetonitrile. The tetramethyl lead, in either phase, can be obtained free of acetonitrile by washing the mixture with water which dissolves the acetonitrile, the tetramethyl lead being insoluble in water. The amount of water so required is relatively small compared with that which would be required to remove the acetonitrile from the original solution, which permits the use of smaller and less costly washing equipment and results in considerable savings in labor, time, water, processing of the wash water to recover acetonitrile therefrom, etc.

When a volatile thermal stabilizer, e.g. benzene, toluene, or xylene, is present in the starting solution, such material will codistill with the tetramethyl lead, acetonitrile, and water when present, forming in effect a more complex azeotropic mixture. The tetramethyl lead-hydrocarbon stabilizer mixture can be recovered, ready for blending with other desired ingredients of an antiknock composition and free of acetonitrile, by washing the distillate with water. In other words, this invention comprises an azeotropic distillation process wherein low-boiling azeotropes, boiling below the normal boiling points of 81.6° C. for acetonitrile and of 110° C. for tetramethyl lead, are formed during the distillation.

This discovery affords a process by which the recovery of tetramethyl lead from reaction mixtures can be conducted without the shortcomings inherent in steam stripping and vacuum distillation. In the process of producing tetramethyl lead by reaction of methyl chloride with sodium-lead alloy, the resulting reaction mass contains tetramethyl lead, catalyst, small amounts of unreacted alloy, sodium chloride, by-product lead, and sometimes thermal stabilizing agents, after venting off unreacted methyl chloride, as disclosed by Jarvie et al., Tullio, and Cook et al. in their patents hereinbefore referred to. By this invention, the tetramethyl lead may be removed from such mass by the addition thereto of at least 0.63 part up to about 100 parts by weight of acetonitrile to each part of tetramethyl lead and distilling off a low boiling mixture of tetramethyl lead and acetonitrile. The 0.63 part of acetonitrile is required for the binary azeotropic composition of 61.2% tetramethyl lead and 38.8% acetonitrile and will dissolve some of the tetramethyl lead, thus providing one source of the solutions to be treated by the process of this invention. Preferably and usually, there will be used at least 1.7 parts by weight of acetonitrile per part of tetramethyl lead, and even a large excess of acetonitrile, say up to about 100 parts, can be used, and the resulting solution of tetramethyl lead in acetonitrile will be separated from the solids before subjecting the solution to azeotropic distillation according to this invention, so as to avoid the possibility of any of the solids deleteriously affecting the acetonitrile during the distillation.

The thermal stabilizing agents present in the reaction masses usually are volatile hydrocarbons, including saturated, unsaturated and aromatic hydrocarbon boiling in the range of 70° C. to 250° C. at atmospheric pressure, e.g. heptane, n-octane, terpenes, benzene, toluene, isooctane, 2,2,5-trimethylhexane, etc., in the range of 1 to 50% by weight of the tetramethyl lead. Usually, about 25% based on the tetramethyl lead is employed. Such thermal stabilizers are soluble in the acetonitrile and hence are extracted from the reaction masses with the tetramethyl lead. However, these thermal stabilizers do not interfere with the azeotropic distillations of this invention since they form known binary azeotropes with acetonitrile which have normal boiling points in the range of about 75° C. to about 81° C. and which codistill with the tetramethyl lead-acetonitrile azeotropic mixtures. The preferred thermal stabilizer is toluene.

Ethylene dichloride is also a useful thermal stabilizing agent for the tetramethyl lead since it also forms a binary azeotrope with acetonitrile which boils at 79.1° C. It codistills with the azeotropic mixtures of tetramethyl lead and acetonitrile and with water, when present, at temperatures below its boiling point and the boiling points of tetramethyl lead and of acetonitrile. Its diluent action improves the thermal stability of the tetramethyl lead during distillation.

In U.S. Patent 3,197,392 to Silversmith and Sloan and in U.S. Patent 3,392,093, the production of tetramethyl lead by the electrolytic reductive alkylation of a lead cathode with a methylating agent such as methyl bromide in acetonitrile containing from about 5% to about 25% of a tetraalkyl-ammonium bromide in which each alkyl group has 1–2 carbon atoms, such as tetraethyl-ammonium bromide and tetramethyl ammonium bromide, as an electrolyte, is disclosed. This process produces reaction mixtures which contain 1 to 10% by weight of tetramethyl lead, 5 to 30% by weight of a tetraalkylammonium bromide, 0 to 6% by weight of water, and 50 to 85% by weight of acetonitrile. Also, there may be present 0.5 to 2.5% by weight of a thermal stabilizer, as described above, based on the total composition.

Such catholyte mixtures constitute additional and preferred solutions of tetramethyl lead in acetonitrile which may be azeotropically distilled by the process of this invention and the tetramethyl lead recovered from the distillate. In the preferred operation of the process, all of the methyl bromide will be removed first at a lower head temperature, e.g. about 3° C. to about 4° C., in a separate still, and the remaining mixture then subjected to the azeotropic distillation. The tetraalkylammonium bromide, being non-volatile, will be left behind in the bottoms from the azeotropic distillation still, and may eventually be recycled to the electrolytic process. The fate of the thermal stabilizer will depend upon the exact properties of the particular one used.

Where water is present, a ternary azeotropic mixture is formed during the distillation, which ternary azeotropic mixture consists of about 31% by weight acetonitrile, 7% water and 62% tetramethyl lead. This ternary azeotropic mixture has a normal boiling point of 69.0° C. and condenses as two liquid phases or layers of which the upper layer is poor in tetramethyl lead and rich in acetonitrile and the lower layer is rich in tetramethyl lead and poor in acetonitrile.

Where a volatile thermal stabilizer is present in the catholyte composition, such material will codistill with the tetramethyl lead, acetonitrile, and catholyte water when present. The tetramethyl lead-hydrocarbon stabilizer composition can be recovered, ready for blending to make antiknock compositions and free of acetonitrile, by washing the distillate with water. With thermal stabilizers present, such as heptane, benzene, toluene and ethylene dichloride, the ternary azeotropic mixture of acetonitrile, water and tetramethyl lead can be obtained substantially free of stabilizer under conditions of careful fractionation. In practice, however, controlled distillation conditions usually will be used such that these volatile thermal stabilizers codistill with the ternary mixture to provide additional stabilization in the condensed distillate.

Usually and preferably, the azeotropic distillations are conducted at about atmospheric pressure and head temperatures of from about 69° C. to about 80° C., most preferably at from about 73° C. to about 76° C. However, they also may be carried out at reduced pressures and correspondingly lower temperatures. Thus, the azeotropic distillation can be conducted at total pressures as low as about 100 mm. Hg, or about 0.2 atmosphere, and head temperatures as low as 35° C. and obtain heretofore unexpected distillates which are mixtures of tetramethyl lead and acetonitrile boiling at temperatures lower than either component alone at such pressures and which contain higher concentrations of tetramethyl lead than the starting solutions, i.e. are enriched in tetramethyl lead content.

The presence of the thermal stabilizers and of water in the distillate fractions obtained by the process of this invention do not intefere with the separation of the distillate fractions into two phases or layers. If the distillate fractions contain at least about 39% by weight of tetramethyl lead, they will separate into two distinct layers (phases) at 25° C. and below, of which the upper layer will be poor in tetramethyl lead and the lower lead will be rich in tetramethyl lead. The concentration of the tetramethyl lead in the two phases will vary with the temperature to which they are subjected, that in the lower layer increasing with decrease in the temperature and that in upper layer decreasing. The temperatures so employed should be above the freezing point of tetramethyl lead, and usually will be in the range of from about 25° C. to about −20° C. The thermal stabilizers and the water when present will normally distribute themselves between the two layers.

The tetramethyl lead can be recovered from the distillate fraction by washing it with water to dissolve out the acetonitrile, leaving the tetramethyl lead and the thermal stabilizer, particularly when the thermal stabilizer is a hydrocarbon, which are substantially insoluble in water. If desired, the two phases can be separated, the lower layer washed with water, and the upper layer recycled to the azeotropic still or subjected to a second azeotropic distillation in a separate still.

The process of this invention may be illustrated by reference to the accompanying drawing. Referring now to the drawing, feed mixture 1 containing tetramethyl lead and acetonitrile and optionally a stabilizer and/or water is distilled in azeotropic still 2. The overhead stream is led via line 3 into receiver 4. Upon cooling, the overhead stream forms a two layer condensate in receiver 4. The tetramethyl lead-poor upper layer 5 is recycled to still 2 via line 8. The tetramethyl lead-rich lower layer 6 is drained from receiver 4 via line 7.

The apparatus and techniques for carrying out azeotropic distillations are well known and conventional in the art and such apparatus and techniques may be used in the process of this invention according to the principles hereinbefore set forth. Some of such apparatus and techniques are disclosed by K. H. Eisenlohr in his paper on "Production of Pure Aromatics by Means of Azeotropic Distillation and Extraction" presented at the 6th Word Petroleum Congress, June 19–26, 1965, section IV, paper 8; by Hamlin in U.S. Patent 2,356,240; by Cines in U.S. Patents 2,602,093 and 2,692,227; and by Redlich et al. in U.S. Patent 2,684,935.

In order to more clearly illustrate this invention, presently preferred modes of practicing it, and advantageous results to be obtained thereby, the following examples are given in which the parts and proportions are by weight except where otherwise specifically indicated, and wherein TML means tetramethyl lead.

EXAMPLE 1

Recovery of TML from a NaPb reaction mass

To an 800 gram sample of solid reaction mass containing 15.8% tetramethyl lead and 0.18% toluene (obtained from methyl chloride and monosodium-lead alloy essentially as described by Jarvie et al. in Example 4 of U.S. Patent 3,048,610), was added 356 grams of dry acetonitrile (MeCN). The solids were filtered from the resulting solution which contained 26.2% by weight of tetramethyl lead (TML), 73.3% by weight of acetonitrile, and 0.5% by weight of toluene. This solution was distilled through a 12 inch distillation column packed with glass helices and connected to a straight distillation head having a thermometer bulb well immersed in the vapor section. The distillation was conducted with pot temperatures of 78–78.5° C., and head temperatures of 73.1–73.5° C. and at atmospheric pressure to yield a major 15 grams first cut which boiled at 73.3±0.2° C. and contained about 61.2% (wt.) TML, about 38.8% (wt.) acetonitrile and a small amount of toluene. Upon cooling to about 25° C. and below, this TML-acetonitrile mixture separated into two liquid phases, the heavier phase being the richer in TML. The concentration of TML in the TML-rich phase is temperature dependent as follows:

| Temperature, °C. | Percent TML in TML-poor phase | Percent TML in TML-rich phase |
|---|---|---|
| 25 | 37.0 | 89.5 |
| 1 | (¹) | 93.5 |
| −20 | (¹) | 96.0 |

¹ Not determined.

It appears that, under the conditions of the distillation, there was formed a constant, low-boiling TML-MeCN (acetonitrile) mixture, which, upon cooling, separated into TML-rich and TML-poor layers, thereby concentrating the TML into the TML-rich layer. Solids were filtered from the original solution as a matter of convenience. It is believed that the results would have been the same without this filtration step.

EXAMPLE 2

Recovery of TML from an electrolytic process catholyte

This distillation was conducted in a 12-inch distillation column packed with glass helices and provided with a take-off head which was connected to two acetone/Dry Ice cold traps set in series, the final trap containing a Drierite drying tube, and receivers set in an ice bath.

296.7 grams of a typical catholyte mixture containing 1.84% water, 6.9 tetraethyl ammonium bromide, 12.9% methyl bromide, 69.5% acetonitrile, and 3.32% TML was distilled at atmospheric pressure until 22.6% of the mixture was removed. The distillation took one hour to reach a constant boiling point, i.e. for 67.1 grams to be distilled from an initial total of 296.7 grams. Of the original TML, 96% was collected in the distillate over the range of 47° C. to 80° C. This compares very favorably with the normal atmospheric boiling points of 81.6° C. for acetonitrile and 110° C. for TML. Such distillate formed two liquid phases or layers.

This example further shows that TML in dilute TML-MeCN solutions can be concentrated by azeotropic distillation at lower than normal temperatures. The fact that 96% of the TML was recovered in the first 22.6% of the distillate indicates that there was formed at least one minimum-boiling azeotropic mixture during the distillation. The methyl bromide (B.P. 3.5° C.), tetraethyl ammonium bromide (nonvolatile), and water, in the amounts shown, do not interfere with the low temperature azeotropic distillation.

EXAMPLE 3

Distillation of acetonitrile/TML in the presence of toluene (thermal stabilizer) under reduced pressure A 110.4 gram mixture containing 7.7% TML, 47% toluene, and 45.3% acetonitrile (MeCN) was distilled through a 12-inch glass helices packed glass distillation column under a reduced pressure of about 149 mm. Two cuts were taken at the indicated head temperatures:

| Cut No. | B. Pt. range | Wt. (gm.) | Percent TML | Percent MeCN | Percent toluene |
|---|---|---|---|---|---|
| 1 | 35–36° C./149 mm | 59.9 | 12.5 | 67.3 | 30.2 |
| 2 | 36.5° C./149 mm | 10.5 | 3.64 | 71.4 | 24.7 |
| Residue | (¹) | 39.0 | (¹) | (¹) | (¹) |

¹ Not determined.

Of the original TML, 87% is contained in cut No. 1 and 92% in the combined cuts. The boiling points of the constituents of the original mixture at 149 mm. pressure are:

|  | Degrees C. |
|---|---|
| Acetonitrile | 37.5 |
| TML | 61 |
| Toluene | 64 |

Thus, the distillation recovered 92% of the original TML at distillate temperatures below the boiling points of any of the original constituents at the same pressure.

This Example 3 shows that TML in a dilute solution of TML and MeCN can be concentrated by distillation at boiling points lower than normal boiling points, under reduced pressure and in the presence of a substantial amount of a thermal stabilizer such as toluene.

EXAMPLE 4

Separation of TML in presence of acetonitrile and ethylene dichloride

The following composition was batch distillated at atmospheric pressure through a 9-plate column at a 5:1 reflux ratio

|  | Percent |
|---|---|
| Acetonitrile (MeCN) | 89.5 |
| Water | 5.0 |
| Tetramethyl lead (TML) | 4.0 |
| Ethylene dichloride (EDC) | 1.5 |

The following cuts were taken overhead and condensed:

| Initial pot temp., °C. | Initial head temp., °C. | Cumulative percent (W/W) distilled ¹ | | Composition (wt. percent) ² | | | | | |
|---|---|---|---|---|---|---|---|---|---|
| | | | | Upper layer | | | Lower layer | | |
| | | Total | TML | EDC | TML | EDC | H₂O | TML | EDC | H₂O |
| 78.3 | 69.0 | 2.3 | 36.4 | 7.6 | 11.6 | 5.7 | ——— | 94.7 | 4.3 | 0.3 |
| 78.6 | 69.3 | 4.5 | 57.8 | 14.6 | 13.0 | 5.4 | 19.0 | 95.1 | 3.8 | 0.3 |
| 78.8 | 74.2 | 6.4 | 67.2 | 19.7 | 12.9 | 4.1 | 18.0 | 98.3 | ——— | ——— |
| 79.0 | 74.4 | 7.9 | 74.0 | 24.3 | 13.3 | 4.3 | ——— | 95.0 | ——— | ——— |
| 79.3 | 74.4 | 11.4 | 84.5 | 33.8 | 12.0 | 4.0 | 18.0 | No second layer | | |
| 79.7 | 75.5 | 14.6 | 89.4 | 41.4 | 6.1 | 3.5 | 19.0 | No second layer | | |
| 79.9 | 75.9 | 18.2 | 91.9 | 49.2 | 2.8 | 3.3 | 19.0 | No second layer | | |

¹ The "Cumulative percent W/W Distilled" shows the total weight of distillate, TML and EDC, respectively, so far collected at the point when each cut was made, expressed as a percentage of the total weight thereof originally charged to the pot. The final pot temperature, after taking off the last cut, was 80.2° C.

² The "Composition (wt. percent)" shows the compositions of the respective liquid layers formed on condensation of the cuts, except for the acetonitrile which may be calculated by subtracting the sum of the percentages of TML, EDC and H₂O from 100%, the last three cuts not separating into two layers.

This example further shows that by the process of this invention one can concentrate tetramethyl lead from dilute acetonitrile solution at lower than normal boiling temperatures in the presence of ethylene dichloride, about 92% of the tetramethyl lead being distilled over in the first 18% of the distillate.

It will be understood that the foregoing examples have been given for illustrative purposes solely, and that this invention is not limited to the specific embodiments described therein. On the other hand, it will be readily apparent to those skilled in the art that, subject to the limitations set forth in the general description, many variations and modifications can be made in the materials, proportions, conditions, techniques and apparatus employed without departing from the spirit or scope of this invention.

From the preceding description, it will be apparent that this invention provides a new and improved process for recovering tetramethyl lead from its solutions in acetonitrile and particularly from reaction mixtures obtained in the manufacture of tetramethyl lead. It constitutes a material improvement in providing concentrated mixtures of tetramethyl lead and acetonitrile, with or without thermal stabilizers, from dilute solutions thereof, from which concentrated mixtures pure tetramethyl lead or mixtures of tetramethyl and thermal stabilizer can be more readily and economically recovered, with a minimum of labor. Particularly, it makes possible the recovery of tetramethyl lead at lower temperatures and more safely than was possible heretofore. Accordingly, it will be apparent that this invention constitutes an important and valuable advance in and contribution to the art.

The embodiments of the invention in which an exclusive property or privilege is claimed are defined as follows:

1. In a process for recovering tetramethyl lead from the reaction mixture resulting from its preparation the improvement which comprises adjusting the composition of said reaction mixture so that it contains 1 to 37% tetramethyl lead and 63 to 99% acetonitrile, based on the combined weights of the two materials; distilling said reaction mixture of adjusted composition under a pressure of 0.2 to 1 atmosphere at a head temperature of 35 to 80° C. but less than the boiling temperature of either tetramethyl lead or acetonitrile at the distillation pressure; taking off at least one overhead fraction which boils below the boiling point of acetonitrile at the distillation pressure and which comprises a two-phase liquid mixture, the lower layer being richer in tetramethyl lead and the upper layer being richer in acetonitrile; and recovering tetramethyl lead from said two-phase liquid mixture.

2. The method of claim 1 in which the tetramethyl lead is recovered by condensing said overhead fraction, allowing said overhead fraction to form two layers recovering the lower layer which is rich in tetramethyl lead.

3. The process of claim 2 in which the overhead fraction contains at least 39% by weight tetramethyl lead, said fraction is cooled to a temperature of 25° to −20° C. whereby it forms two liquid layers of which the lower layer is enriched in tetramethyl lead, and the lower layer is washed with water to remove the acetonitrile.

4. The process of claim 3 in which the reaction mixture of adjusted composition is distilled at a head temperature of 69° to 80° C. under a pressure of 1 atmosphere.

5. The process of claim 3 in which the reaction mixture of adjusted composition contains 1 to 37% by weight of tetramethyl lead, 0.5 to 50% by weight, based on the tetramethyl lead, of a thermal stabilizer for the tetramethyl lead selected from the group consisting of hydrocarbon and ethylene dichloride, and the rest acetonitrile, and the overhead fraction comprises a mixture of tetramethyl lead, thermal stabilizer, and acetonitrile.

6. The process of claim 5 in which the reaction mixture of adjusted composition contains 1 to 37% by weight of tetramethyl lead, 0.5 to 2.5% by weight of a thermal stabilizer for the tetramethyl lead selected from the group consisting of hydrocarbons and ethylene dichloride, and the rest acetonitrile.

7. The process of claim 6 in which the thermal stabilizer is toluene.

8. The process of claim 6 in which the thermal stabilizer is ethylene dichloride.

9. The process of claim 5 in which the reaction mixture of adjusted composition contains 1 to 10% by weight of tetramethyl lead, 5 to 30% by weight of a tetraalkylammonium bromide in which each alkyl group has 1–2 carbon atoms, 0 to 6% by weight of water, 0.5 to 2.5% by weight of thermal stabilizer and the rest acetonitrile, and the overhead fraction comprises a mixture of tetramethyl lead, thermal stabilizer, acetonitrile, and water when present.

10. The process of claim 9 in which the thermal stabilizer is toluene.

11. The process of claim 5 in which the reaction mixture of adjusted composition is formed by dissolving a reaction mass resulting from the reaction of methyl chloride with monosodium lead alloy in the presence of a catalyst and a thermal stabilizer for the tetramethyl lead selected from the group consisting of hydrocarbons and ethylene dichloride with 1.7 to 100 parts by weight of acetonitrile per part of tetramethyl lead.

12. A binary azeotrope in the vapor state which comprises, by weight, 61.2% tetramethyl lead and 38.8% acetonitrile which boils at 73.3° C. at atmospheric pressure and which, when cooled to 25° C., separates into two liquid layers, the upper layer being rich in acetonitrile and poor in tetramethyl lead and the lower layer being rich in tetramethyl lead and poor in acetonitrile.

13. A ternary azeotrope in the vapor state which comprises, by weight, 31% acetonitrile, 7% water and 62% tetramethyl lead which boils at 69.0° C. and condenses as two liquid layers, the upper layer being rich in acetonitrile and poor in tetramethyl lead and the lower layer being rich in tetramethyl lead and poor in acetonitrile.

References Cited

UNITED STATES PATENTS 3,197,392 7/1965 Silversmith _____ 204—59
3,221,039 11/1965 Cook et al. _____ 260—437

OTHER REFERENCES

Weissberger: Techniques of Organic Chemistry, vol. IV—Distillation, 1956, New York, pp. 364–368.

WILBUR L. BASCOMB, JR., *Primary Examiner.*

U.S. Cl. X.R.

203—44, 57, 60, 67; 69, 91; 204—59; 252—1; 260—437